(12) United States Patent
He et al.

(10) Patent No.: US 12,042,942 B2
(45) Date of Patent: Jul. 23, 2024

(54) ROBOT HAND-EYE CALIBRATION METHOD AND APPARATUS, COMPUTING DEVICE, MEDIUM AND PRODUCT

(71) Applicant: Siemens Ltd., China, Beijing (CN)

(72) Inventors: Yin Zeng He, Beijing (CN); Qi Xiao Chen, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 366 days.

(21) Appl. No.: 17/627,846

(22) PCT Filed: Jul. 19, 2019

(86) PCT No.: PCT/CN2019/096906
§ 371 (c)(1),
(2) Date: Jan. 18, 2022

(87) PCT Pub. No.: WO2021/012122
PCT Pub. Date: Jan. 28, 2021

(65) Prior Publication Data
US 2022/0258352 A1 Aug. 18, 2022

(51) Int. Cl.
*B25J 9/16* (2006.01)
*B25J 13/08* (2006.01)
*G06T 7/80* (2017.01)

(52) U.S. Cl.
CPC ........... *B25J 9/1692* (2013.01); *B25J 9/1697* (2013.01); *B25J 13/085* (2013.01); *G06T 7/80* (2017.01); *G06T 2207/30204* (2013.01)

(58) Field of Classification Search
CPC ...... B25J 9/1692; B25J 9/1697; B25J 13/085; G06T 7/80; G06T 2207/30204;
(Continued)

(56) References Cited

U.S. PATENT DOCUMENTS 4,969,108 A * 11/1990 Webb ................... B25J 9/1684
901/42
5,014,183 A * 5/1991 Carpenter ............ G05B 19/425
700/254
(Continued)

FOREIGN PATENT DOCUMENTS

CN 102310409 A 1/2012
CN 103192386 A 7/2013
(Continued)

OTHER PUBLICATIONS

International Search Report and Written Opinion dated Apr. 9, 2020.
(Continued)

*Primary Examiner* — Jaime Figueroa
(74) *Attorney, Agent, or Firm* — Harness, Dickey & Pierce, P.L.C.

(57) ABSTRACT

When a force sensor on a robot arm detects that the force of contact between an end of a calibration device and a calibration plate reaches a threshold, the robot arm stops, and the end of the calibration device performs marking at the contact position between the end of the calibration device and the calibration plate. The robot arm moves upward and stops at a position where the end of the robot arm is at a predetermined height. At this position, a camera at the end of the robot arm photographs marks on the calibration plate, records the coordinates of the marks in the camera coordinate system, and records the coordinates of the end of the calibration device in the robot coordinate system. A calibration transformation matrix is calculated according to the recorded coordinates of at least three marks.

20 Claims, 5 Drawing Sheets

(58) Field of Classification Search
CPC ............ G06T 2207/30244; G06T 7/73; G05B 2219/39045; G05B 2219/39057
USPC ................. 700/245–264; 318/568.11–568.25
See application file for complete search history.

(56) References Cited

U.S. PATENT DOCUMENTS

| | | | | |
|---|---|---|---|---|
| 5,475,584 | A * | 12/1995 | Bani-Hashemi | G06T 7/80 700/62 |
| 5,821,943 | A * | 10/1998 | Shashua | G06T 15/20 345/419 |
| 5,845,048 | A * | 12/1998 | Masumoto | B25J 9/1697 706/20 |
| 6,816,755 | B2 * | 11/2004 | Habibi | B25J 9/1697 901/42 |
| 7,019,825 | B2 * | 3/2006 | Roh | B25J 9/1692 356/139.03 |
| 7,151,853 | B2 * | 12/2006 | Roh | G06V 10/147 382/199 |
| 7,867,167 | B2 * | 1/2011 | Boctor | A61B 8/4245 600/437 |
| 8,379,014 | B2 | 2/2013 | Wiedemann | G06V 30/1914 345/428 |
| 8,559,699 | B2 * | 10/2013 | Boca | B25J 9/1679 382/153 |
| 8,688,274 | B2 * | 4/2014 | Shieh | B25J 9/1692 700/250 |
| 9,221,176 | B2 * | 12/2015 | Suzuki | B25J 9/1697 |
| 9,338,439 | B2 * | 5/2016 | Grossmann | H04N 13/246 |
| 9,367,914 | B2 * | 6/2016 | Hager | G06T 7/579 |
| 9,457,470 | B2 * | 10/2016 | Lundberg | B25J 9/1697 |
| 9,517,560 | B2 * | 12/2016 | Amano | B25J 9/1692 |
| 9,718,190 | B2 * | 8/2017 | Larkin | B25J 9/1694 |
| 10,335,116 | B2 * | 7/2019 | Boctor | A61B 34/30 |
| 10,369,698 | B1 * | 8/2019 | Islam | G06T 7/50 |
| 10,373,336 | B1 * | 8/2019 | Islam | B25J 9/1697 |
| 10,628,966 | B1 * | 4/2020 | Islam | G06T 7/60 |
| 10,636,172 | B1 * | 4/2020 | Islam | G06T 7/60 |
| 11,015,956 | B2 * | 5/2021 | Tang | B64D 47/08 |
| 11,036,241 | B2 * | 6/2021 | Zhou | G05D 1/106 |
| 2001/0053204 | A1 * | 12/2001 | Navab | A61B 6/547 378/207 |
| 2003/0144765 | A1 * | 7/2003 | Habibi | G06T 1/0007 700/259 |
| 2004/0102911 | A1 * | 5/2004 | Roh | G06T 7/80 702/85 |
| 2006/0095226 | A1 * | 5/2006 | Roh | B25J 9/1692 250/201.3 |
| 2007/0280508 | A1 * | 12/2007 | Ernst | G01R 33/56509 382/107 |
| 2008/0269604 | A1 * | 10/2008 | Boctor | A61B 8/00 600/437 |
| 2009/0096790 | A1 * | 4/2009 | Wiedemann | B25J 9/1692 345/427 |
| 2010/0149183 | A1 * | 6/2010 | Loewke | G06V 20/693 345/424 |
| 2012/0004774 | A1 | 1/2012 | Umetsu | |
| 2012/0143370 | A1 * | 6/2012 | Shieh | B25J 9/1692 700/254 |
| 2013/0321583 | A1 * | 12/2013 | Hager | G06T 7/579 348/46 |
| 2014/0229005 | A1 * | 8/2014 | Suzuki | B25J 9/1692 700/254 |
| 2015/0025683 | A1 * | 1/2015 | Amano | B25J 9/1692 700/254 |
| 2015/0088311 | A1 * | 3/2015 | Suzuki | B25J 9/1697 700/254 |
| 2015/0297177 | A1 * | 10/2015 | Boctor | A61B 34/30 901/47 |
| 2016/0039094 | A1 * | 2/2016 | Lundberg | B25J 9/1692 700/251 |
| 2016/0081668 | A1 * | 3/2016 | Chirikjian | A61B 90/361 600/407 |
| 2016/0258782 | A1 * | 9/2016 | Sadjadi | A61B 34/10 |
| 2017/0153122 | A1 * | 6/2017 | Tang | B64C 39/024 |
| 2017/0368687 | A1 | 12/2017 | Huang et al. | |
| 2018/0194008 | A1 | 7/2018 | Namiki et al. | |
| 2018/0222055 | A1 * | 8/2018 | Wang | B25J 9/1697 |
| 2018/0222056 | A1 * | 8/2018 | Suzuki | B25J 9/0096 |
| 2019/0047145 | A1 * | 2/2019 | Akeel | B25J 9/1697 |
| 2019/0113537 | A1 * | 4/2019 | Zhou | G05D 1/102 |

FOREIGN PATENT DOCUMENTS

| | | |
|---|---|---|
| CN | 105844670 A | 8/2016 |
| CN | 106272424 A | 1/2017 |
| CN | 107808401 A | 3/2018 |
| CN | 108972567 A | 12/2018 |
| CN | 109671122 A | 4/2019 |
| DE | 102018200154 A1 | 7/2018 |
| JP | 2010149267 A | 7/2010 |
| JP | 2012040634 A | 3/2012 |
| JP | 2012091280 A | 5/2012 |
| JP | 2014184530 A | 10/2014 |
| TW | 201805129 A | 2/2018 |
| WO | WO 2014161603 A1 | 10/2014 |

OTHER PUBLICATIONS

Chen, Chichyang et al: "A New Robotic Hand/Eye Calibration Method by Active Viewing of a Checkerboard Pattern", Proceedings of The International Conference on Robotics and Automation Atlanta, May 2-6, 1993; [Proceedings of The International Conference on Robotics and Automation], Los Alamitos, IEEE Comp. Soc. Press, US, vol. 2, May 4, 1993 (May 4, 1993), pp. 770-775, XP000402734, DOI: 10.1109/ROBOT.1993.291941 ISBN: 978-0-8186-3450-5 the whole document.

Lippiello, Vincenzo et al: "Robot Interaction Control Using Force and Vision", Intelligent Robots and Systems, 2006 IEEE/RSJ International Conference on, IEEE, PI, Oct. 1, 2006 (Oct. 1, 2006), pp. 1470-1475, XP031006290, ISBN: 978-1-4244-0258-8 • p. 1470-p. 1475; figure 1.

* cited by examiner

ROBOT HAND-EYE CALIBRATION METHOD AND APPARATUS, COMPUTING DEVICE, MEDIUM AND PRODUCT

CROSS-REFERENCE TO RELATED APPLICATION (S)

This application is the National Phase under 35 U.S.C. § 371 of PCT International Application No. PCT/CN2019/096906, which has an international filing date of Jul. 19, 2019, and which designated the United States of America, the entire contents of which are incorporated herein by reference.

FIELD

Embodiments of the present disclosure in general relate to the field of robots, and in particular to a robot hand-eye calibration method, an apparatus, a computing device, a medium, and a product.

BACKGROUND

In industrial applications, robots need to rely on a hand-eye system to perform tasks such as machining, installation, etc. The hand-eye system is a visual system including a camera and a robot arm. The camera is equivalent to the human eye, and the end of the robot arm is equivalent to a human hand.

Vision positioning guides the robot arm to perform tasks. Firstly, the camera coordinates and the robot coordinates must be calibrated, so that the camera coordinates for vision positioning are converted into the robot coordinates to complete the vision guidance, wherein hand-eye calibration is the key to the vision-guided robot arm.

At present, this hand-eye calibration process is usually done manually, and the robot needs to be taught by the camera. Specifically, a calibration needle is mounted at the end of a robot arm, and the robot arm is manually operated to move to nine points of a calibration target. Since the target positions in both the camera coordinate system and the robot coordinate system need to be collected to calculate the calibration data, this requires a lot of work by the developer; in addition, because the accuracy of the calibration needle will affect the calibration accuracy, and the manual operation of the robot arm to move to the nine points requires high precision, the calibration accuracy is greatly affected by human factors and it takes a long time to complete the calibration. Therefore, the conventional hand-eye calibration method has problems such as a complex calibration process, low calibration efficiency, and the calibration accuracy greatly affected by human factors.

Moreover, the calibration accuracy will also be affected if the imaging plane of the camera is not completely parallel to the calibration target.

SUMMARY

A brief summary of embodiments of the present invention is given below in order to provide a basic understanding of certain embodiments of the present invention. It should be understood that this is not an exhaustive summary of the embodiments. It is not intended to define the key or important parts of the present invention, nor is it intended to limit the scope of the present invention. Its purpose is only to give some concepts in a simplified form as a prelude to the more detailed description that follows.

In view of the above, embodiments of the present disclosure provide a method for automatic hand-eye calibration with high measurement accuracy. In the technical solution of the present disclosure, a force sensor is introduced to the robot arm, and automatic hand-eye calibration can be realized by use of the force sensor.

According to at least one embodiment of the present disclosure, a robot hand-eye calibration method is provided, comprising: a coordinate recording step: controlling a calibration apparatus at an end of a robot arm to move to a calibration target; when a force sensor on the robot arm detects that a force of the end of the calibration apparatus in contact with the calibration target reaches a preset force, stopping the robot arm moving, marking a position in which the end of the calibration apparatus is in contact with the calibration target, and causing the robot arm to move upward in a direction perpendicular to the calibration target and stop until the end of the robot arm is in a position of a preset height; and in this position, photographing the mark on the calibration target using a camera at the end of the robot arm, recording coordinates of the mark in a camera coordinate system, and recording coordinates of the end of the calibration apparatus in a robot coordinate system when the robot arm is stopped in this position; a movement control step: controlling the robot arm to translate at least twice above the calibration target, and performing the coordinate recording step after each movement; and a transformation matrix calculating step: calculating a calibration transformation matrix according to coordinates of at least three recorded marks on the calibration target in the camera coordinate system and the corresponding coordinates of the end of the calibration apparatus in the robot coordinate system.

In this way, a calibration apparatus at an end of a robot arm is controlled to mark successively at least three times on a calibration target, a camera is used to photograph each mark, and the coordinates of each mark in the camera coordinate system and the coordinates of the end of the calibration apparatus in the camera coordinate system at the time of photographing a mark are recorded to calculate the calibration transformation matrix, wherein a force sensor is used to detect contact between the end of the calibration apparatus and the calibration target, so that the robot arm can know when to stop moving and when to mark, thereby the robot hand-eye calibration process can be automatically completed without human operation.

Optionally, in one example of the abovementioned embodiment, before the coordinate recording step is performed, the method further comprises a parallelization correcting step: performing correction using the force sensor, so that an imaging plane of the camera is parallel to a plane of the calibration target.

Optionally, in one example of the abovementioned embodiment, the parallelization correcting step comprises: obtaining a torque of the end of the robot arm using the force sensor; and adjusting a posture of the end of the robot arm based on the torque, so that the imaging plane of the camera disposed at the end of the robot arm is parallel to the plane of the calibration target.

In this way, it is possible to make the imaging plane of the camera parallel to the plane of the calibration target, so as to reduce the calibration error because the image plane of the camera is not parallel to the plane of the calibration target, and to improve the accuracy of hand-eye calibration.

Optionally, in one example of the abovementioned embodiment, the preset height is preset according to a focal length of the camera, so that the mark on the calibration target is clearly imaged on the imaging plane of the camera.

In this way, the camera can be kept at a proper distance from the calibration target during photographing, to ensure the clarity of the camera images, thereby further improving the calibration accuracy.

According to another embodiment of the present disclosure, a robot hand-eye calibration apparatus is provided, comprising: a coordinate recording unit, which controls a calibration apparatus at an end of a robot arm to move to a calibration target; when a force sensor on the robot arm detects that a force of an end of the calibration apparatus in contact with the calibration target reaches a preset force, stops the robot arm moving, marks a position in which the end of the calibration apparatus is in contact with the calibration target, and causes the robot arm to move upward in a direction perpendicular to the calibration target and stop until the end of the robot arm is in a position of a preset height; and in this position, photographs the mark on the calibration target using a camera at the end of the robot arm, records coordinates of the mark in a camera coordinate system, and records coordinates of the end of the calibration apparatus in a robot coordinate system when the robot arm is stopped in this position; a movement control unit, which controls the calibration apparatus to move at least twice above the calibration target, and perform the coordinate recording step after each movement; and a transformation matrix calculating unit, which calculates a calibration transformation matrix according to coordinates of at least three recorded marks on the calibration target in the camera coordinate system and the corresponding coordinates of the end of the calibration apparatus in the robot coordinate system.

In this way, a calibration apparatus at an end of a robot arm is controlled to mark successively on a calibration target, a camera is used to photograph each mark, and the coordinates of each mark in the camera coordinate system and the coordinates of the end of the calibration apparatus in the camera coordinate system at the time of photographing a mark are recorded to calculate the calibration transformation matrix, wherein a force sensor is used to detect contact between the end of the calibration apparatus and the calibration target, so that the robot arm can know when to stop moving and when to mark, thereby the robot hand-eye calibration process can be automatically completed without human operation.

Optionally, in one example of the abovementioned embodiment, the robot hand-eye calibration apparatus further comprises: a parallelization correcting unit, which performs correction using the force sensor, so that an imaging plane of the camera is parallel to a plane of the calibration target.

Optionally, in one example of the abovementioned embodiment, the parallelization correcting unit is further configured to: obtain a torque of the end of the robot arm using the force sensor; and adjust a posture of the end of the robot arm based on the torque, so that the imaging plane of the camera disposed at the end of the robot arm is parallel to the plane of the calibration target.

In this way, it is possible to make the imaging plane of the camera parallel to the plane of the calibration target, so as to reduce the calibration error because the image plane of the camera is not parallel to the plane of the calibration target, and to improve the accuracy of hand-eye calibration.

Optionally, in one example of the abovementioned embodiment, the preset height is preset according to a focal length of the camera, so that the mark on the calibration target is clearly imaged on the imaging plane of the camera.

In this way, the camera can be kept at a proper distance from the calibration target during photographing, to ensure the clarity of the camera images, thereby further improving the calibration accuracy.

According to another embodiment of the present disclosure, a robot arm is provided, comprising: a force sensor; a camera; and a calibration apparatus, wherein the force sensor detects a force of an end of the calibration apparatus in contact with a calibration target, and obtains a torque of the robot arm.

A force sensor is used to detect contact between the end of the calibration apparatus and the calibration target, so that the robot arm can know when to stop moving and when to mark, thereby the robot hand-eye calibration process can be automatically completed without human operation.

According to another embodiment of the present disclosure, a computing device is provided, comprising: at least one processor; and a memory coupled to the at least one processor, wherein the memory is used to store an instruction that, when executed by the at least one processor, causes the processor to perform the method described above.

According to another embodiment of the present disclosure, a non-transitory machine readable medium is provided, which stores an executable instruction that, when executed, causes a machine to perform the method described above.

According to another embodiment of the present disclosure, a computer program product is provided, which is tangibly stored in a computer readable medium and comprises a computer executable instruction that, when executed, causes at least one processor to perform the method described above.

BRIEF DESCRIPTION OF THE DRAWINGS

With reference to the following description of embodiments of the present invention in conjunction with the accompanying drawings, it will be easier to understand the above and other objectives, features and advantages of the present invention. The components in the drawings are only intended to illustrate the principle of the present invention. In the drawings, the same or similar technical features or components will be represented by the same or similar reference numerals. The following drawings are only intended to illustrate and explain the present invention schematically, and do not limit the scope of the present invention.

REFERENCE NUMERALS IN THE DRAWINGS

Figure 1:
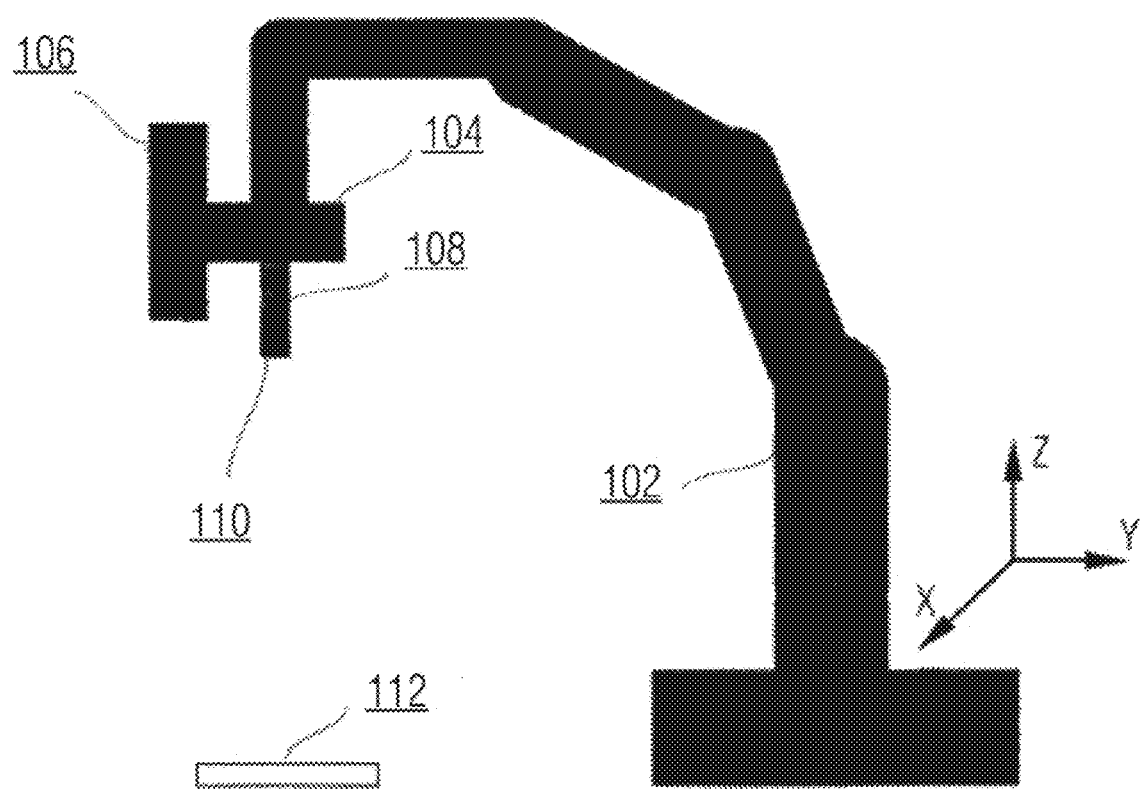
FIG. 1 is a schematic diagram of the robot arm according to an embodiment of the present disclosure.

102: robot arm
104: force sensor
106: camera
108: calibration apparatus
110: end of the calibration apparatus 112: calibration target
200: robot hand-eye calibration method
S201, S202, S204, S206, S302, and S304: steps
400: robot hand-eye calibration apparatus
401: parallelization correcting unit
402: coordinate recording unit
404: movement control unit
406: transformation matrix calculating unit
500: computing device
502: processor
504: memory

DETAILED DESCRIPTION

A brief summary of embodiments of the present invention is given below in order to provide a basic understanding of certain embodiments of the present invention. It should be understood that this is not an exhaustive summary of the embodiments. It is not intended to define the key or important parts of the present invention, nor is it intended to limit the scope of the present invention. Its purpose is only to give some concepts in a simplified form as a prelude to the more detailed description that follows.

In view of the above, embodiments of the present disclosure provide a method for automatic hand-eye calibration with high measurement accuracy. In the technical solution of the present disclosure, a force sensor is introduced to the robot arm, and automatic hand-eye calibration can be realized by use of the force sensor.

According to one embodiment of the present disclosure, a robot hand-eye calibration method is provided, comprising: a coordinate recording step: controlling a calibration apparatus at an end of a robot arm to move to a calibration target; when a force sensor on the robot arm detects that a force of the end of the calibration apparatus in contact with the calibration target reaches a preset force, stopping the robot arm moving, marking a position in which the end of the calibration apparatus is in contact with the calibration target, and causing the robot arm to move upward in a direction perpendicular to the calibration target and stop until the end of the robot arm is in a position of a preset height; and in this position, photographing the mark on the calibration target using a camera at the end of the robot arm, recording coordinates of the mark in a camera coordinate system, and recording coordinates of the end of the calibration apparatus in a robot coordinate system when the robot arm is stopped in this position; a movement control step: controlling the robot arm to translate at least twice above the calibration target, and performing the coordinate recording step after each movement; and a transformation matrix calculating step: calculating a calibration transformation matrix according to coordinates of at least three recorded marks on the calibration target in the camera coordinate system and the corresponding coordinates of the end of the calibration apparatus in the robot coordinate system.

In this way, a calibration apparatus at an end of a robot arm is controlled to mark successively at least three times on a calibration target, a camera is used to photograph each mark, and the coordinates of each mark in the camera coordinate system and the coordinates of the end of the calibration apparatus in the camera coordinate system at the time of photographing a mark are recorded to calculate the calibration transformation matrix, wherein a force sensor is used to detect contact between the end of the calibration apparatus and the calibration target, so that the robot arm can know when to stop moving and when to mark, thereby the robot hand-eye calibration process can be automatically completed without human operation.

Optionally, in one example of the abovementioned embodiment, before the coordinate recording step is performed, the method further comprises a parallelization correcting step: performing correction using the force sensor, so that an imaging plane of the camera is parallel to a plane of the calibration target.

Optionally, in one example of the abovementioned embodiment, the parallelization correcting step comprises: obtaining a torque of the end of the robot arm using the force sensor; and adjusting a posture of the end of the robot arm based on the torque, so that the imaging plane of the camera disposed at the end of the robot arm is parallel to the plane of the calibration target.

In this way, it is possible to make the imaging plane of the camera parallel to the plane of the calibration target, so as to reduce the calibration error because the image plane of the camera is not parallel to the plane of the calibration target, and to improve the accuracy of hand-eye calibration.

Optionally, in one example of the abovementioned embodiment, the preset height is preset according to a focal length of the camera, so that the mark on the calibration target is clearly imaged on the imaging plane of the camera.

In this way, the camera can be kept at a proper distance from the calibration target during photographing, to ensure the clarity of the camera images, thereby further improving the calibration accuracy.

According to another embodiment of the present disclosure, a robot hand-eye calibration apparatus is provided, comprising: a coordinate recording unit, which controls a calibration apparatus at an end of a robot arm to move to a calibration target; when a force sensor on the robot arm detects that a force of an end of the calibration apparatus in contact with the calibration target reaches a preset force, stops the robot arm moving, marks a position in which the end of the calibration apparatus is in contact with the calibration target, and causes the robot arm to move upward in a direction perpendicular to the calibration target and stop until the end of the robot arm is in a position of a preset height; and in this position, photographs the mark on the calibration target using a camera at the end of the robot arm, records coordinates of the mark in a camera coordinate system, and records coordinates of the end of the calibration apparatus in a robot coordinate system when the robot arm is stopped in this position; a movement control unit, which controls the calibration apparatus to move at least twice above the calibration target, and perform the coordinate recording step after each movement; and a transformation matrix calculating unit, which calculates a calibration transformation matrix according to coordinates of at least three recorded marks on the calibration target in the camera coordinate system and the corresponding coordinates of the end of the calibration apparatus in the robot coordinate system.

In this way, a calibration apparatus at an end of a robot arm is controlled to mark successively on a calibration target, a camera is used to photograph each mark, and the coordinates of each mark in the camera coordinate system and the coordinates of the end of the calibration apparatus in the camera coordinate system at the time of photographing a mark are recorded to calculate the calibration transformation matrix, wherein a force sensor is used to detect contact between the end of the calibration apparatus and the calibration target, so that the robot arm can know when to stop moving and when to mark, thereby the robot hand-eye calibration process can be automatically completed without human operation.

Optionally, in one example of the abovementioned embodiment, the robot hand-eye calibration apparatus further comprises: a parallelization correcting unit, which performs correction using the force sensor, so that an imaging plane of the camera is parallel to a plane of the calibration target.

Optionally, in one example of the abovementioned embodiment, the parallelization correcting unit is further configured to: obtain a torque of the end of the robot arm using the force sensor; and adjust a posture of the end of the robot arm based on the torque, so that the imaging plane of the camera disposed at the end of the robot arm is parallel to the plane of the calibration target.

In this way, it is possible to make the imaging plane of the camera parallel to the plane of the calibration target, so as to reduce the calibration error because the image plane of the camera is not parallel to the plane of the calibration target, and to improve the accuracy of hand-eye calibration.

Optionally, in one example of the abovementioned embodiment, the preset height is preset according to a focal length of the camera, so that the mark on the calibration target is clearly imaged on the imaging plane of the camera.

In this way, the camera can be kept at a proper distance from the calibration target during photographing, to ensure the clarity of the camera images, thereby further improving the calibration accuracy.

According to another embodiment of the present disclosure, a robot arm is provided, comprising: a force sensor; a camera; and a calibration apparatus, wherein the force sensor detects a force of an end of the calibration apparatus in contact with a calibration target, and obtains a torque of the robot arm.

A force sensor is used to detect contact between the end of the calibration apparatus and the calibration target, so that the robot arm can know when to stop moving and when to mark, thereby the robot hand-eye calibration process can be automatically completed without human operation.

According to another embodiment of the present disclosure, a computing device is provided, comprising: at least one processor; and a memory coupled to the at least one processor, wherein the memory is used to store an instruction that, when executed by the at least one processor, causes the processor to perform the method described above.

According to another embodiment of the present disclosure, a non-transitory machine readable medium is provided, which stores an executable instruction that, when executed, causes a machine to perform the method described above.

According to another embodiment of the present disclosure, a computer program product is provided, which is tangibly stored in a computer readable medium and comprises a computer executable instruction that, when executed, causes at least one processor to perform the method described above.

The subject described herein will now be discussed with reference to some exemplary implementations. It should be understood that the discussion of these implementations is only intended to enable those skilled in the art to better understand and realize the subject described herein, and is not intended to limit the scope, applicability, or examples set forth in the claims. The functions and arrangement of the discussed elements may be changed without departing from the scope of the present disclosure. Various processes or components may be deleted, replaced or added in each example as needed. For example, the method described herein may be executed in a sequence different from the described sequence, and various steps may be added, omitted, or combined. In addition, the features described in relation to some examples may also be combined in other examples.

As used herein, the term "comprising" and its variations is an open term that means "including but not limited to". The term "based on" means "at least partially based on". The term "one embodiment" or "an embodiment" means "at least one embodiment". The term "another embodiment" means "at least one other embodiment". The term "first", "second", etc. may refer to different or the same objects. Other definitions, either explicit or implicit, may be included below. Unless clearly indicated in the context, the definition of a term is consistent throughout the description.

The present disclosure provides a method for automatic robot hand-eye calibration with high measurement accuracy. In the technical solution of the present disclosure, a force sensor is introduced to the robot arm, and automatic hand-eye calibration can be realized by use of the force sensor.

FIG. 1 is a schematic diagram of the robot according to one embodiment of the present disclosure. In FIG. 1, 102 is a robot arm, 104 is a force sensor provided on the robot arm, 106 is a camera provided at one end of the robot arm, 108 is a calibration apparatus provided at the end of the robot arm, 110 is one end of the calibration apparatus 108, and 112 is a calibration target.

Specifically, the camera 106 is fixed at an appropriate position at the end of the robotic arm 102, the calibration apparatus 108 is fixed at an appropriate position at the end of the robot arm 102, and the relative positions of the end 110 of the calibration apparatus and the robot arm 102 can be obtained through a tool coordinate system calibration program known to those skilled in the art. The force sensor 104 is mounted between the robot arm 102 and the calibration apparatus 108. It can be understood that FIG. 1 is a schematic diagram of a robot arm provided with a force sensor, wherein the relationship between the various components is only schematic, and those skilled in the art may set the positional relationship between the various components as required, without being limited to that shown in FIG. 1.

The force sensor 104 can be used to detect the magnitude of the contact force between the end 110 of the calibration apparatus and the calibration target 112. When the contact force detected reaches a preset magnitude, the robot arm will stop moving, and the end 110 of the calibration tool can mark this contact position on the calibration target 112. Then, the calibration transformation matrix can be calculated by recording the coordinates of at least three marks in the camera coordinate system and the coordinates of the end of the calibration apparatus in the robot coordinate system at the time of photographing, so as to implement hand-eye calibration of the robot.

The robot hand-eye calibration method and apparatus according to the embodiments of the present disclosure will be described below with reference to the accompanying drawings.

Figure 2:
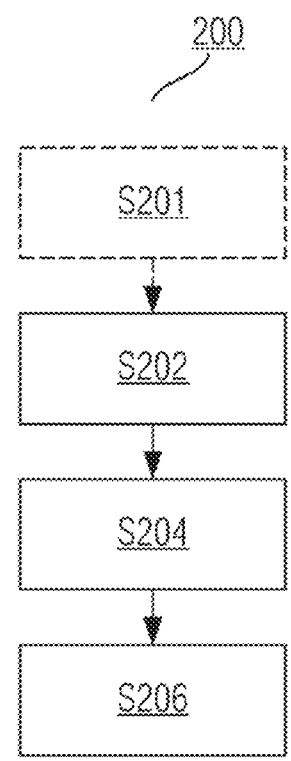
FIG. 2 is a flowchart of an exemplary process of the robot hand-eye calibration method according to an embodiment of the present disclosure.

FIG. 2 is a flowchart of an exemplary process of the robot hand-eye calibration method 200 according to one embodiment of the present disclosure.

Firstly, in block S202, a coordinate recording step is performed, wherein the calibration apparatus at the end of the robot arm is controlled to move to the calibration target; when a force sensor on the robot arm detects that a force of an end of the calibration apparatus in contact with the calibration target reaches a preset force, movement of the robot arm is stopped, the position in which the end of the calibration apparatus is in contact with the calibration target is marked, and the robot arm is moved upward in a direction perpendicular to the calibration target and stopped at a preset height; and in this position, the mark on the calibration target is photographed by the camera at the end of the robot arm, the coordinates of the mark in the camera coordinate system are recorded, and the coordinates of the end of the calibration apparatus in the robot coordinate system when the robot arm is stopped in this position are recorded.

Specifically, the force sensor 104 provided on the robot arm 102 can be used to detect the magnitude of the contact force between the end 110 of the calibration apparatus 108 and the calibration target 112. When the force sensor 104 detects that the contact force between the end 110 of the calibration apparatus 108 and the calibration target 112 has reached a preset magnitude, the robot arm 102 will stop moving, and the end 110 of the calibration apparatus 108 can mark this contact position on the calibration target 112.

Here, the contact force of a preset magnitude can be such that the end of the calibration apparatus 108 just properly marks the calibration target 112, and the preset magnitude can be set in advance by technical personnel based on experience.

After marking, the robot arm 102 leaves the calibration target 112, moves upward to a preset height in a direction perpendicular to the calibration target 112, and stops at this position, where the camera 106 photographs the mark on the calibration target 112.

Here, the preset height can be preset according to the focal length of the camera, so that the mark on the calibration target is clearly imaged on the imaging plane of the camera.

Manual focusing is required since the industrial lenses usually used in robots are not auto-focusing. This means that objects at a certain distance are the sharpest in the image. The image of an object too close or too far away will not be clear. For another thing, at different distances, the image size of an object shot by a CCD/CMOS camera will differ (reflected as different physical distances between two pixels), and hand-eye calibration makes sense only when performed at a fixed distance.

The camera 106 is fixed at an appropriate position at the end of the robot arm 102, and the two-dimensional position of the camera 106 relative to the end of the robot arm 102 can be obtained by calibration. To keep a proper distance between the lens of the camera 106 and the calibration target 112, the distance between the end of the robot arm 102 and the calibration target 112 is determined mainly by accurate calculation. In one example, it can be verified by measured values, and it can be ensured that the calibration target is always on the focal plane of the camera (i.e., the image is clear) by adjusting the photographing height.

Therefore, a preset height is set in advance based on the focal length of the camera 106, and the robot arm 102 stops at the preset height, so that the camera 102 can photograph at a position that is at an appropriate distance from the calibration target 11, to ensure the clarity of the camera image, thereby further improving the calibration accuracy.

Next, the coordinates of the mark in the camera coordinate system, and the coordinates of the end of the calibration apparatus in the robot coordinate system when the camera captures the mark, i.e., when the robot arm stops at the preset height, are recorded.

Through the operation in block S202, a set of coordinates in the camera coordinate system and in the robot coordinate system for performing robot hand-eye calibration can be obtained.

Next, in block S204, the robot arm is controlled to translate above the calibration target at least twice, and the operation in block S202 is performed after each movement.

Through moving the robot arm and then performing the operation in block S202 each time, at least three sets of coordinates in the camera coordinate system and in the robot coordinate system for performing robot hand-eye calibration can be obtained in total.

At last, in block S206, the calibration transformation matrix is calculated based on the coordinates of the at least three marks on the calibration target in the camera coordinate system and the corresponding coordinates of the end of the calibration apparatus in the robot coordinate system.

Those skilled in the art can understand the specific process of calculating the transformation matrix based on the three sets of coordinates, which will not be detailed here.

In the method according to this embodiment, a calibration apparatus at an end of a robot arm is controlled to mark successively at least three times on a calibration target, a camera is used to photograph each mark, and the coordinates of each mark in the camera coordinate system and the coordinates of the end of the calibration apparatus in the camera coordinate system at the time of photographing a mark are recorded to calculate the calibration transformation matrix. In the process, a force sensor is used to detect contact between the end of the calibration apparatus and the calibration target, so that the robot arm can know when to stop moving and when to mark, thereby the robot hand-eye calibration process can be automatically completed without human operation.

In one example, before the hand-eye calibration process, the method may further comprise the parallelization correcting step in block S201: performing correction using the force sensor, so that an imaging plane of the camera is parallel to a plane of the calibration target.

Figure 3:
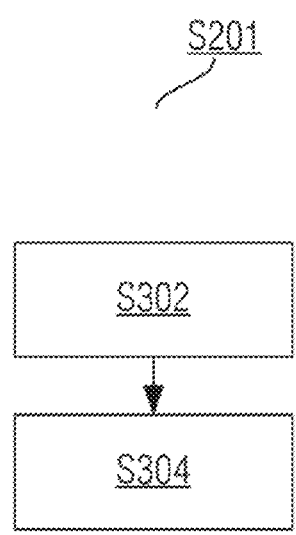
FIG. 3 is a flowchart of an exemplary process of the operation of block S208 in FIG. 2.

Specifically, as shown in FIG. 3, the operation in block S201 can be implemented through the following process.

Firstly, in block S302, the force sensor 104 is used to obtain the torque of the end of the robot arm 102.

Next, in block S304, the posture of the end of the robot arm 102 is adjusted based on the torque, so that the imaging plane of the camera 106 disposed at the end of the robot arm 102 is parallel to the plane of the calibration target 112.

Specifically, based on the torque value obtained by the sensor, the posture of the end of the robot arm can be adjusted through an algorithm, so that the torque value reaches a set value to ensure that the imaging plane of the camera provided at the end of the robot arm is parallel to the plane of the calibration target.

That is, before performing robot hand-eye calibration, the posture of the end of the robot arm is determined through the parallelization correcting step so that the imaging plane of the camera on the end of the robot arm is parallel to the plane of the calibration target. When moving the robot arm thereafter, the posture of the robot arm is kept unchanged, but the robot arm is moved only in the x, y, and z directions.

When parallelization between the imaging plane of the camera and the plane of the calibration target is realized through the method shown in FIG. 3, it is possible to reduce the calibration error because the image plane of the camera is not parallel to the plane of the calibration target, thereby improving the accuracy of hand-eye calibration.

Figure 4:
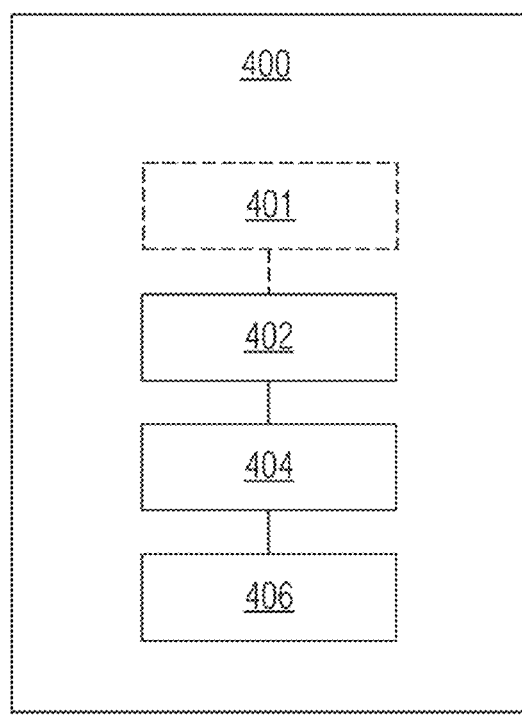
FIG. 4 is a block diagram of an exemplary configuration of the robot hand-eye calibration apparatus according to an example embodiment of the present disclosure.

FIG. 4 is a block diagram of an exemplary configuration of the robot hand-eye calibration apparatus 400 according to one embodiment of the present disclosure.

As shown in FIG. 4, the robot hand-eye calibration apparatus 400 comprises: a coordinate recording unit 402, a movement control unit 404 and a transformation matrix calculating unit 406.

Specifically, the robot coordinate recording unit 402 controls the calibration apparatus at the end of the robot arm to move to the calibration target; when a force sensor on the robot arm detects that a force of an end of the calibration apparatus in contact with the calibration target reaches a preset force, movement of the robot arm is stopped, the end of the calibration apparatus marks its position where it is in contact with the calibration target, and the robot arm is moved upward in a direction perpendicular to the calibration target and stopped at a preset height of the end of the robot arm; and in this position, the mark on the calibration target is photographed by the camera at the end of the robot arm, the coordinates of the mark in the camera coordinate system are recorded, and the coordinates of the end of the calibration apparatus in the robot coordinate system when the robot arm is stopped in this position are recorded.

In this process, the preset height is preset according to the focal length of the camera, so that the mark on the calibration target is clearly imaged on the imaging plane of the camera.

The movement control unit 404 controls the calibration apparatus to move above the calibration target at least twice.

The transformation matrix calculating unit 406 calculates the transformation matrix based on the coordinates of at least three marks on the calibration target in the camera coordinate system and the corresponding coordinates of the end of the calibration apparatus in the robot coordinate system.

In one example, the robot hand-eye calibration apparatus 400 may further comprise a parallelization correcting unit 401, and the parallelization correcting unit 401 performs correction using the force sensor so that the imaging plane of the camera is parallel to the plane of the calibration target.

Specifically, the parallelization correcting unit 401 may be configured to: obtain a torque of the end of the robot arm using the force sensor; and adjust a posture of the end of the robot arm based on the torque, so that the imaging plane of the camera disposed at the end of the robot arm is parallel to the plane of the calibration target.

The details of the operation and function of each part of the robot hand-eye calibration apparatus 400 may be, for example, the same as or similar to those of relevant parts of the robot hand-eye calibration method in the embodiments of the present disclosure described with reference to FIGS. 1 to 3, and will not be detailed here.

It should be noted that the robot hand-eye calibration apparatus 400 shown in FIG. 4 and the structure of the units thereof are only exemplary, and those skilled in the art can modify the structural black diagram shown in FIG. 4 as needed.

The robot hand-eye calibration method and apparatus according to the embodiments of the present disclosure are described above with reference to FIGS. 1 to 4. The robot hand-eye calibration apparatus above may be implemented as hardware or software or a combination thereof.

Figure 5:
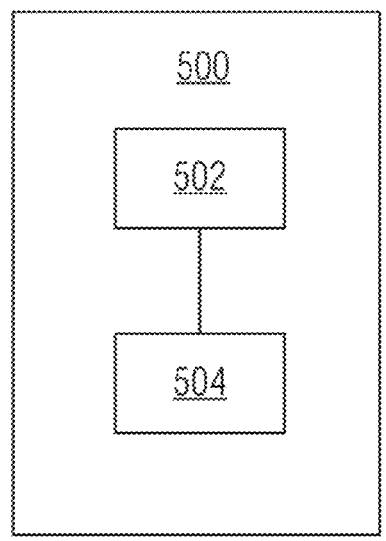
FIG. 5 is a block diagram of the computing device for robot hand-eye calibration according to embodiments of the present disclosure.

In the present disclosure, the robot hand-eye calibration apparatus 400 may be implemented as a computing device. FIG. 5 is a block diagram of the computing device 500 for robot hand-eye calibration according to the embodiments of the present disclosure. According to one embodiment, the computing device 500 may comprise at least one processor 502, and the processor 502 executes at least one computer-readable instruction (i.e., an element implemented in the form of software as described above) stored or encoded in a computer-readable storage medium (i.e., the memory 504).

In one embodiment, the computer-executable instruction stored in the memory 504, when executed, causes the at least one processor 502 to complete the following actions: controlling a calibration apparatus at an end of a robot arm to move to a calibration target; when a force sensor on the robot arm detects that a force of an end of the calibration apparatus in contact with the calibration target reaches a preset force, stopping the robot arm moving, marking a position in which the end of the calibration apparatus is in contact with the calibration target, and causing the robot arm to move upward in a direction perpendicular to the calibration target and stop until the end of the robot arm is in a position of a preset height; and in this position, photographing the mark on the calibration target using a camera at the end of the robot arm, recording coordinates of the mark in a camera coordinate system, and recording coordinates of the end of the calibration apparatus in a robot coordinate system when the robot arm is stopped in this position; controlling the robot arm to translate at least twice above the calibration target, and performing the coordinate recording step after each movement; and calculating a calibration transformation matrix according to coordinates of at least three recorded marks on the calibration target in the camera coordinate system and the corresponding coordinates of the end of the calibration apparatus in the robot coordinate system.

It should be understood that the computer-executable instruction stored in the memory 504, when executed, causes the at least one processor 502 to perform the various operations and functions in each embodiment of the present disclosure described above with reference to FIGS. 1 to 4.

According to one embodiment, a non-transitory machine-readable medium is provided. The non-transitory machine-readable medium may have a machine-executable instruction (i.e., element implemented in the form of software as described above) that, when executed by a machine, causes the machine to execute the various operations and functions in each of the embodiments of the present disclosure described above with reference to FIGS. 1 to 4.

According to one embodiment, a computer program product is provided, comprising a computer-executable instruction, which, when executed, causes at least one processor to perform the various operations and functions described above in each of the embodiments of the present disclosure with reference to FIGS. 1 to 4.

The exemplary embodiments described above for specific implementations with reference to the drawings are not all the embodiments that can be implemented or fall within the scope of the claims. The term "exemplary" used throughout this description means "serving as an example, instance, or illustration", and does not mean "preferred to" or "advantageous over" other embodiments. For the purpose of providing an understanding of the described techniques, the specific implementations comprise specific details. However, these techniques can be implemented without these specific details. In some examples, in order to avoid incomprehensibility of the concepts of the described embodiments, structures and devices in the general common knowledge are shown in the form of block diagrams.

The foregoing description of the present disclosure is provided to enable anyone ordinarily skilled in the art to implement or use the present disclosure. For those ordinarily skilled in the art, various modifications to the present disclosure are obvious, and the general principles defined herein can also be applied to other modifications without departing from the scope of the present disclosure. Therefore, the present disclosure is not limited to the examples and designs described herein, but is consistent with the widest scope that conforms to the principles and novel features disclosed herein.

What is claimed is:

1. A robot hand-eye calibration method, comprising:
a coordinate recording step including
controlling a calibration apparatus at an end of a robot arm to move to a calibration target,
when a force sensor on the robot arm detects that a force of an end of the calibration apparatus in contact with the calibration target reaches a threshold force, stopping the robot arm,
marking a position in which the end of the calibration apparatus is in contact with the calibration target, and
causing the robot arm to move upward in a direction perpendicular to the calibration target and stop when the end of the robot arm is in a position at a first height; and
in position at the first height,
photographing the mark on the calibration target using a camera at the end of the robot arm,
recording coordinates of the mark in a camera coordinate system, and
recording coordinates of the end of the calibration apparatus in a robot coordinate system when the robot arm is stopped in the position at the first height;
a movement control step including controlling the robot arm to translate at least twice above the calibration target, and performing the coordinate recording step after each movement; and
a transformation matrix calculating step including calculating a calibration transformation matrix according to coordinates of at least three recorded marks on the calibration target in the camera coordinate system and corresponding coordinates of the end of the calibration apparatus in the robot coordinate system.

2. The method according to claim 1, wherein before the coordinate recording step is performed, the method further comprises:
a parallelization correcting step including performing correction using the force sensor, so that an imaging plane of the camera is parallel to a plane of the calibration target.

3. The method according to claim 2, wherein the parallelization correcting step comprises:
obtaining a torque of the end of the robot arm using the force sensor; and
adjusting a posture of the end of the robot arm based on the torque, so that the imaging plane of the camera at the end of the robot arm is parallel to the plane of the calibration target.

4. The method according to claim 1, wherein the first height is set according to a focal length of the camera, so that the mark on the calibration target is imaged on an imaging plane of the camera.

5. A robot hand-eye calibration apparatus comprising:
a coordinate recording unit configured to:
control a calibration apparatus at an end of a robot arm to move to a calibration target,
when a force sensor on the robot arm detects that a force of an end of the calibration apparatus in contact with the calibration target reaches a threshold force, stop the robot arm, mark a position in which the end of the calibration apparatus is in contact with the calibration target, and cause the robot arm to move upward in a direction perpendicular to the calibration target and stop when the end of the robot arm is in a position at a first height, and
in the position at the first height, photograph the mark on the calibration target using a camera at the end of the robot arm, record coordinates of the mark in a camera coordinate system, and record coordinates of the end of the calibration apparatus in a robot coordinate system when the robot arm is stopped in the position at the first height;
a movement control unit configured to control the calibration apparatus to move at least twice above the calibration target, and perform the coordinate recording step after each movement; and
a transformation matrix calculating unit configured to calculate a calibration transformation matrix according to coordinates of at least three recorded marks on the calibration target in the camera coordinate system and corresponding coordinates of the end of the calibration apparatus in the robot coordinate system.

6. The apparatus according to claim 5, further comprising:
a parallelization correcting unit configured to perform correction using the force sensor, so that an imaging plane of the camera is parallel to a plane of the calibration target.

7. The apparatus according to claim 6, wherein the parallelization correcting unit is further configured to:
obtain a torque of the end of the robot arm using the force sensor; and
adjust a posture of the end of the robot arm based on the torque, so that the imaging plane of the camera at the end of the robot arm is parallel to the plane of the calibration target.

8. The apparatus according to claim 5, wherein the first height is set according to a focal length of the camera, so that the mark on the calibration target is imaged on an imaging plane of the camera.

9. A robot arm, comprising:
a force sensor;
a camera; and
a calibration apparatus; wherein
the force sensor is configured to detect a force of an end of the calibration apparatus in contact with a calibration target, and obtain a torque of the robot arm.

10. A computing device, comprising:
at least one processor; and
a memory coupled to the at least one processor, the memory being configured to store computer-executable instructions that, when executed by the at least one processor, cause the at least one processor to perform the method according to claim 1.

11. A non-transitory machine readable storage medium storing executable instructions that, when executed by at least one processor at a machine, causes the machine to perform the method according to claim 1.

12. A computer program product tangibly stored on a non-transitory computer readable medium, and comprising computer executable instructions that, when executed by at least one processor, cause at least one processor to perform the method according to claim 1.

13. The method according to claim 2, wherein the first height is set according to a focal length of the camera, so that the mark on the calibration target is imaged on an imaging plane of the camera.

14. The method according to claim 3, wherein the first height is set according to a focal length of the camera, so that the mark on the calibration target is imaged on the imaging plane of the camera.

15. The apparatus according to claim 6, wherein the first height is set according to a focal length of the camera, so that the mark on the calibration target is clearly imaged on an imaging plane of the camera.

16. The apparatus according to claim 7, wherein the first height is set according to a focal length of the camera, so that the mark on the calibration target is clearly imaged on the imaging plane of the camera.

17. A computing device, comprising:
   at least one processor; and
   a memory coupled to the at least one processor, the memory being configured to store computer-executable instructions that, when executed by the at least one processor, cause the at least one processor to perform the method according to claim 2.

18. A computing device, comprising:
   at least one processor; and
   a memory coupled to the at least one processor, the memory being configured to store computer-executable instructions that, when executed by the at least one processor, cause the at least one processor to perform the method according to claim 3.

19. A computing device, comprising:
   at least one processor; and
   a memory coupled to the at least one processor, the memory being configured to store computer-executable instructions that, when executed by the at least one processor, cause the at least one processor to perform the method according to claim 4.

20. A non-transitory machine readable storage medium storing executable instructions that, when executed by at least one processor at a machine, cause the machine to perform the method according to claim 2.

* * * * *